US007110978B1

(12) United States Patent
Chin

(10) Patent No.: US 7,110,978 B1
(45) Date of Patent: Sep. 19, 2006

(54) INTERNET-BASED MONEY ORDER SYSTEM

(75) Inventor: Stephen Chin, New York, NY (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 09/307,485

(22) Filed: May 10, 1999

(51) Int. Cl.
*G06F 17/06* (2006.01)
(52) U.S. Cl. .......................................... 705/39; 705/37
(58) Field of Classification Search ............ 705/30–44, 705/34, 27, 16–18
See application file for complete search history.

(56) References Cited

U.S. PATENT DOCUMENTS

| | | | | |
|---|---|---|---|---|
| 4,025,905 | A * | 5/1977 | Gorgens ..................... | 709/227 |
| 5,220,501 | A * | 6/1993 | Lawlor et al. ............... | 364/408 |
| 5,377,271 | A * | 12/1994 | Foreman et al. ............. | 380/51 |
| 5,897,625 | A * | 4/1999 | Gustin et al. ................. | 705/43 |
| 5,899,980 | A | 5/1999 | Wilf et al. | |
| 5,949,044 | A * | 9/1999 | Walker et al. ............... | 235/379 |
| 5,993,047 | A * | 11/1999 | Novogrod et al. .......... | 700/231 |
| 6,012,045 | A * | 1/2000 | Barzilai et al. .............. | 705/37 |
| 6,012,048 | A * | 1/2000 | Gustin et al. ................. | 705/39 |
| 6,029,150 | A | 2/2000 | Kravitz | |
| 6,044,363 | A * | 3/2000 | Mori et al. .................... | 705/37 |
| 6,058,379 | A * | 5/2000 | Odom et al. ................. | 705/37 |
| 6,058,417 | A * | 5/2000 | Hess et al. ................... | 709/219 |
| 6,064,990 | A | 5/2000 | Goldsmith | |
| 6,070,798 | A * | 6/2000 | Nethery ................. | 235/462.01 |
| 6,073,117 | A * | 6/2000 | Oyanagi et al. ............. | 705/38 |
| 6,078,907 | A | 6/2000 | Lamm | |
| 6,119,106 | A * | 9/2000 | Mersky et al. ................ | 705/40 |
| 6,141,653 | A * | 10/2000 | Conklin et al. ............... | 705/80 |
| 6,167,386 | A * | 12/2000 | Brown ......................... | 705/37 |
| 6,260,024 | B1 * | 7/2001 | Shkedy | |
| 6,267,292 | B1 * | 7/2001 | Walker et al. ............... | 235/379 |
| 6,367,693 | B1 * | 4/2002 | Novogrod .................... | 235/379 |
| 6,609,113 | B1 * | 8/2003 | O'Leary | |

FOREIGN PATENT DOCUMENTS

WO WO 00/34899 A1 6/2000
WO WO-00/34899 A1 * 6/2000

OTHER PUBLICATIONS

Electronic Clearing HSE: American Express unit orders 1,000 Electronic Banker systems from Electronic Clearing House, Apr. 18, 1991, Dialog file 810, Accession No. 0222680.*
X.COM, *Do More with Your Money*, downloaded from website http://www.x.com.
DOTBANK, *The Way to Send and receive Money on the Internet*, downloaded from website http://www.dotbank.com.
Microsoft Corporation, *Real-Time Systems and Microsoft Windows NT*, downloaded from website http://msdn.microsoft.com

* cited by examiner

*Primary Examiner*—Frantzy Poinvil

(57) ABSTRACT

A system and method for purchasing a money order via the internet including the steps of providing an internet based money order system capable of generating money orders upon the receipt of a purchase request by a prospective buyer via the internet for a predetermined amount of funds. The prospective buyer transmits information to the money order system, via the internet, which information is required to purchase the money order. The money order is then remotely generated by the money order system and is delivered to an intended recipient of the money order.

8 Claims, 3 Drawing Sheets

INTERNET-BASED MONEY ORDER SYSTEM

FIELD OF THE INVENTION

The present invention relates to an internet-based money order system, and more particularly, to an internet-based money order system which is implemented in conjunction with financial transactions conducted via the internet.

BACKGROUND OF THE INVENTION

Auctions for sale of products have proven to be very popular and the success of the systems involve two major features. Typically with auction systems, there is the possibility to obtain the product at a very competitive price. In addition, there is the excitement and skill of the buyer who participates in the auction process and makes fast decisions whether to continue to participate or to recognize the price has become too high. The auction process, traditionally, has been a relatively fast process which changes quickly. The standard auction process involves users bidding for a particular product, and the product is sold to the highest bidder.

The dynamic nature of the auction process, in its traditional form, is attractive to a certain number of participants, but it is also an obstacle to a further group of participants who do not wish to rush their decision process. For this reason, there are other variations of the auction process where the time period for the auction is much longer and the feedback of information tends to be slower. Some auction processes do not provide any real time feedback, such as a silent auction process, where users merely submit their bid, which is confidential.

A further variation of the auction process is a reverse auction where the price of the product decreases in a set manner during the time period of the auction and each participant is provided with the current price, the quantity on hand and the time remaining in the auction. This type of auction, typically, takes place over a very short period of time and there is a flurry of activity in the last portion of the auction process. The actual auction terminates when there is no more product to be sold or the time period expires.

The auction process for the sale of products has also been used on internet with great success. In this case, the various users send messages to the auction site with details of their bid and identity. Details of the bid are posted on the auction site computer and are available to other participants. The auction process typically has a time period of several days or weeks, and the product is allocated to the highest bidders.

However, one of the disadvantages of this system is the remittance of payment between the seller and awarded purchaser. For instance, since the seller is typically a private individual, the only way for the seller to securely obtain the funds for the sale is through a money order sent from an awarded buyer. This is because it is not advisable for a seller to rely on personal checks, and the seller typically does not have the resources available to process credit card transactions and other types of automatic debit transactions. Moreover, it is typically inconvenient for the awarded buyer to purchase a money order, since this usually involves going to a bank, post office or financial store to do so, which mitigates the convenience of the internet transaction.

SUMMARY OF THE INVENTION

Accordingly, the present invention is directed to a method and system for purchasing a money order from a money order system via the internet in response to goods being purchased from an internet-based auction transaction.

The method preferably includes first awarding a bid to a buyer for goods to be purchased from a seller from an auction process conducted between a buyer and seller, via the internet, on an internet auction site. The awarded buyer then contacts the internet site for the money order system, preferably via the internet, after the bid is awarded to the buyer. The buyer then preferably transmits information to the money order system, via the internet, in order to purchase the money order required for the sale of the awarded goods. Such information preferably includes at least the buyers identification, an identification of the seller and a financial amount for the money order. After this information is received by the money order system, a money order is generated by the money order system. This money order is then delivered from the money order system to the seller to complete the sale of goods between the buyer and seller. The seller may then ship the goods to the buyer.

BRIEF DESCRIPTION OF THE DRAWINGS

The above and other objects and advantages of the present invention will become more readily apparent upon consideration of the following detailed description, taken in conjunction with the accompanying drawings, in which like reference characters refer to like parts throughout the drawings and in which.

DETAILED DESCRIPTION OF THE PREFERRED EMBODIMENTS

Figure 1:
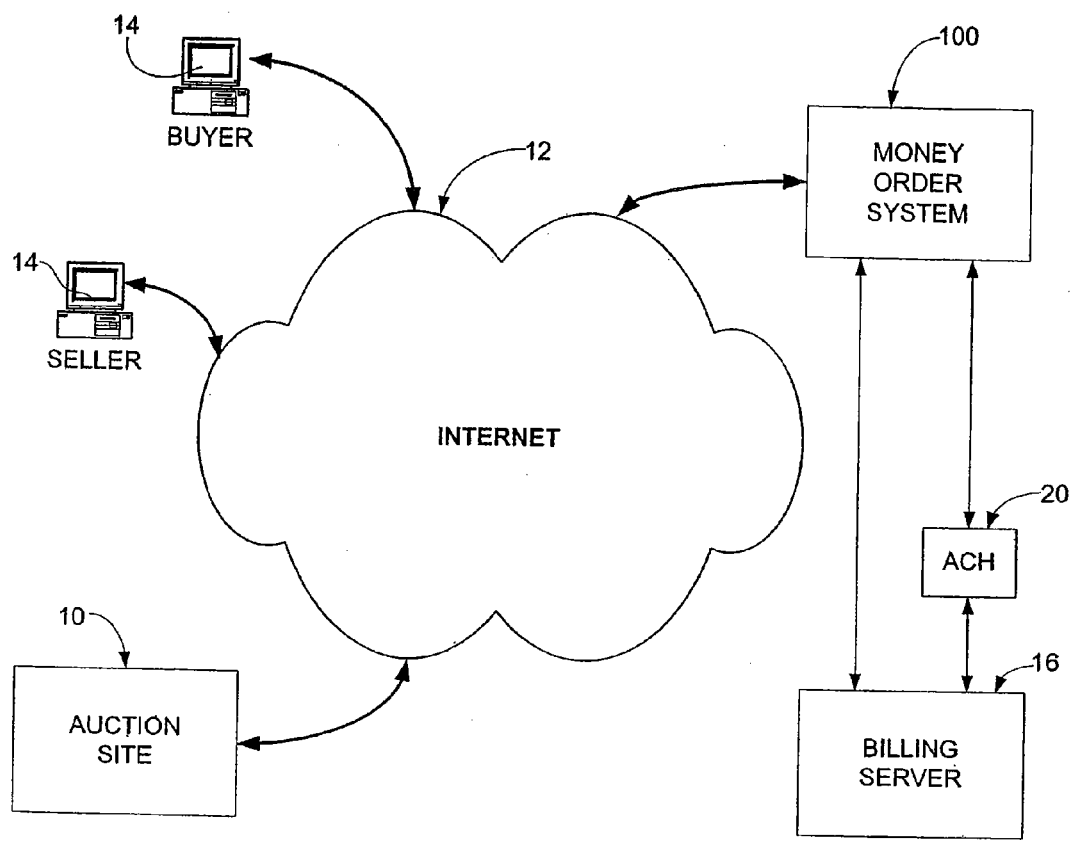
FIG. 1 is an overview of the money order system as implemented in the internet.

FIG. 1 is an overview of the present invention system implementing the electronic money order system, designated generally by 100, as used with an internet based auction system 10. It is to be appreciated, that such auction sites are well known and thus will not be described in detail so as not to obscure the present invention of integrating the electronic money ordering system 100 with an auction site 10, via preferably the internet 12.

With reference to FIG. 1, a host of users 14 are shown connected to the internet 12. Also shown connected to the internet 12 is an auction site 10, money order system 100 and billing server 16., Each user 14 preferably has a computer terminal with the appropriate software for accessing the internet 12. It is to be appreciated that a detail description of the internet auction site 12 is not provided as they are well known in the art. See for example, U.S. Pat. No. 5,890,138 to Gordon et al., which is hereby incorporated by reference.

Figure 2:
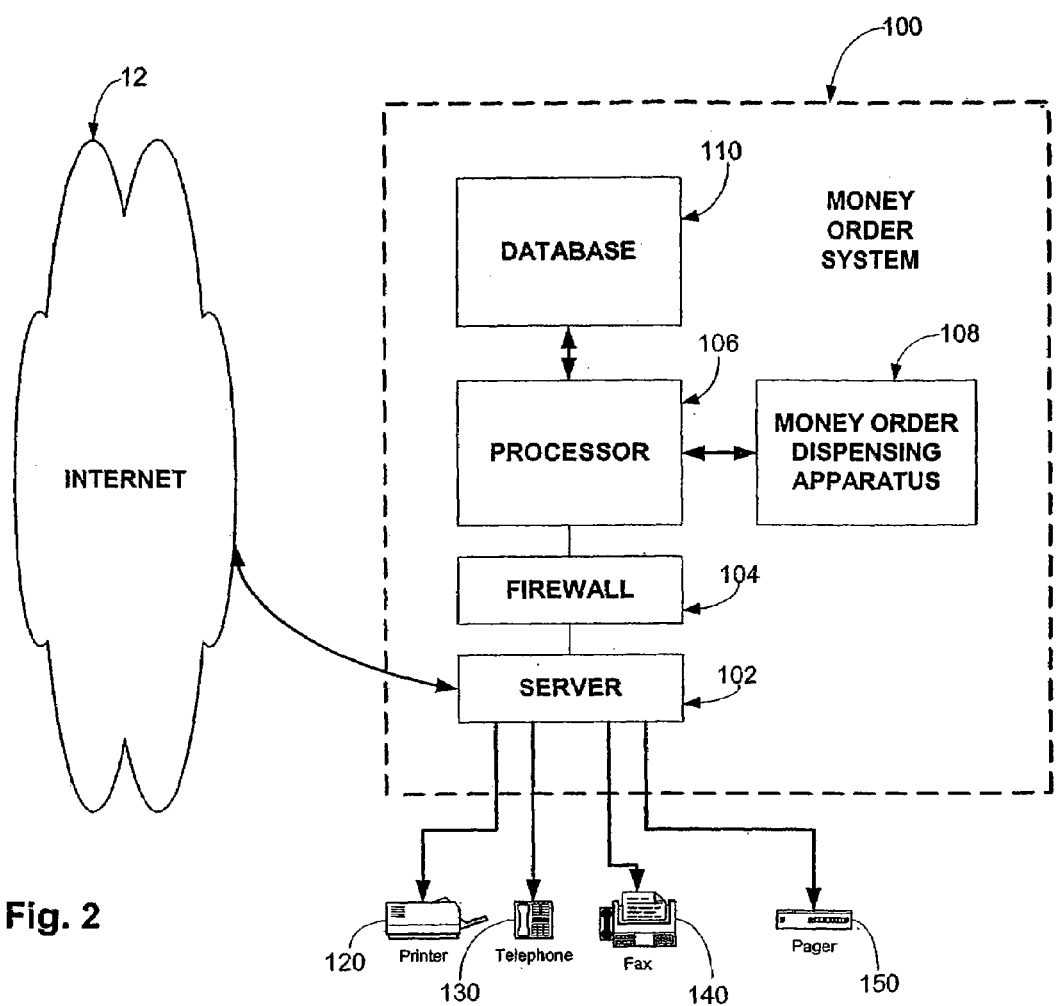
FIG. 2 depicts the system components of the money order system of FIG. 1.

Referring now to FIG. 2, the money order system 100 is shown to preferably include a server 102, computer processor 106, money order dispenser 108 and database 110. The server 102 connects the money order system 100 to the internet 12. It is noted that the server 102 is preferably connected to a firewall 104 so as to prevent any user from accessing any of the components behind the firewall 104. In this way, the users have access to the money order system server computers 102, but only have access to the database 110 through the firewall 104.

The database 110 preferably includes the user's information, if any, and the money order dispensing apparatus 108 which is operative to generate money orders purchased via the internet 12. With returning reference to FIG. 1, the money order system 100 is shown to be preferably coupled to a billing server 16. The billing server 16 is operative to process credit card transactions on behalf of the money order system 100, as will be described further below. For example, when a user desires to purchase a money order from the money order system 100, the user may do so via a credit card, in which the user provides the necessary information (e.g., credit card type, number, billing address, etc.) to the money order system 100. The money order system 100 then transmits this credit card information to the billing server 16 which processes and authorizes the sale of the money order to the user. Afterwhich, the billing server 16 transmits the authorized funds from the user's credit card bank to the bank associated with the money order system, which financial transactions are typically accomplished via an Automated Clearing House (ACH) 20.

The server 102 of money order system 100 may also be preferably connected to a printing device 120, telephone 130, facsimile device 140 and pager 150. As will be described further below, the server 102 is coupled to any one of these devices in order to be able to sent messages to both the sender and receiver of purchased money orders. For instance, after a sale is authorized, a message may be transmitted to the sender who purchased the money order stating that the money order was authorized and is being shipped to the receiver. And, likewise a message may be transmitted to the receiver that a money order was authorized for identified goods and is currently being shipped, which enables the receiver (e.g., the seller) to ship the goods to the buyer eventhough it has not yet received the money order but knows it is going to receive the money order since it has a message from a secure third party (i.e., money order system 100) affirmatively stating that the money has been authorized is being sent to the receiver.

Figure 3:
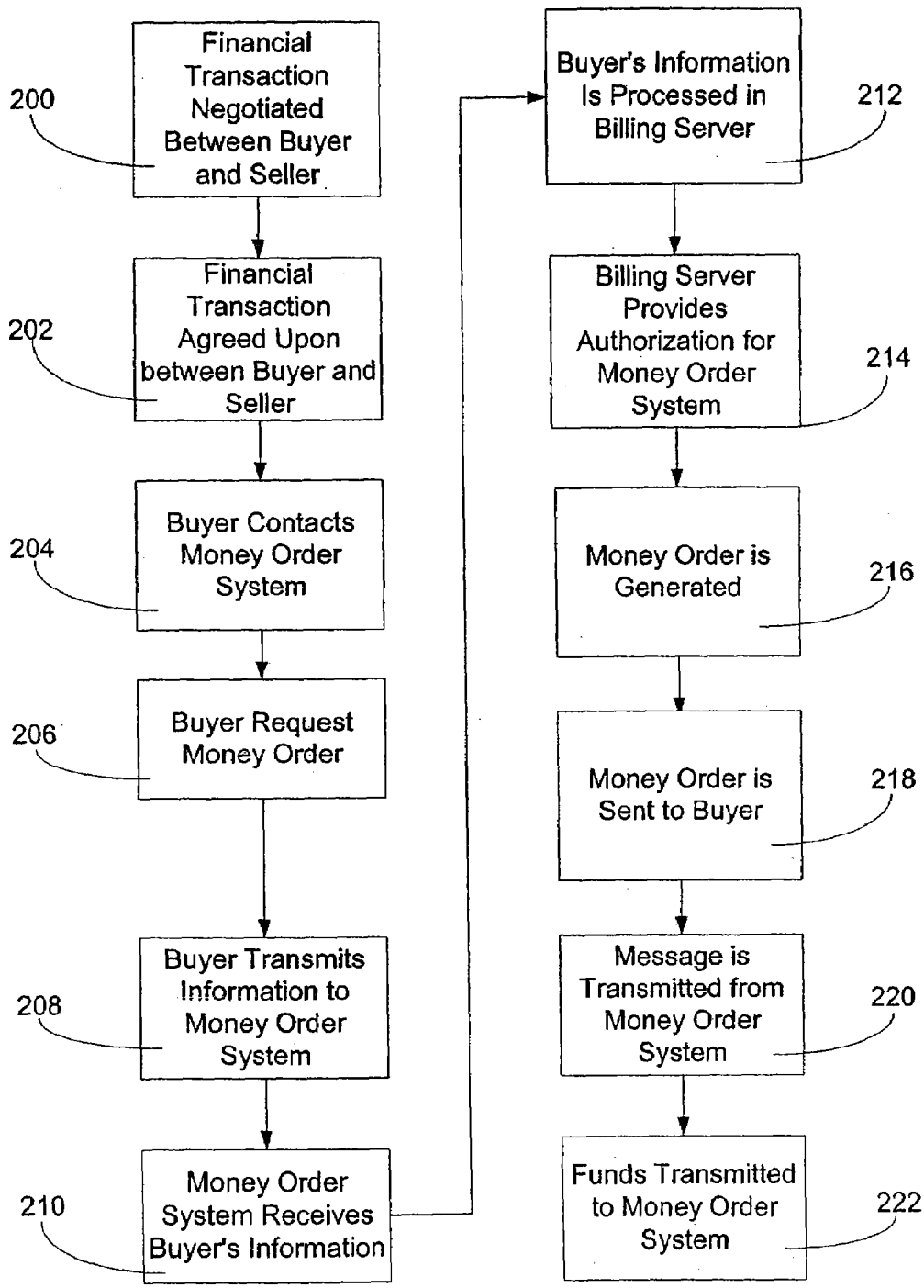
FIG. 3 is a flowchart of the steps taken by the money order system of FIG. 1 to generate a money order via the internet.

With the system components being described above, its method of operation will now be described in reference to the flowchart of FIG. 3. First, with a sale transaction between a buyer and seller being consummated (step 200), the buyer is to be obligated to financially satisfy the transaction with a money order that is to be purchased and delivered to the seller.

In the preferred embodiment, this transaction is achieved via an internet-based auction transaction in which the buyer was the awarded bidder for the goods listed by the seller on the auction site 10. However, such an internet auction transaction is not to be the only type of financial transaction between buyer and seller for implementation of the money order system 100, but rather it may include any type of transaction between buyer and seller, wherein the buyer is obligated to deliver a money order to the seller. In this regard, it may encompass an internet-based merchant who is selling goods on the internet but does not have the capability to effect credit card transactions and thus requires money orders for goods purchased.

Next, after the financial transaction is consummated between the buyer and seller (step 202), the buyer (e.g., user 14) contacts the money order system 100, preferably via the internet 12 (step 204). In this regard, the aforesaid internet contact is preferably accomplished through the provision of a hyper-link to the money order system site 100, which hyper-link is provided in the seller's web site. For instance, if it is an auction-based transaction, the auction site preferably provides a hyper-link on one of their web pages to web site of the money order system 100. Preferably, this hyper-link is provided on the web page awarding the buyer the highest bid, thus all the awarded buyer needs to do after being awarded the bid is to click on the hyper-link connecting to the money order system 100 so as to remotely purchase a money order from the money order system 100, which subsequently transmits that money order to the seller without requiring the buyer 14 from leaving a computer terminal.

Once the buyer has contacted the money order system 100, the buyer's request for a money order is then transmitted to the money order system 100 (step 206). This request preferably includes the following information: the name and address of both the buyer and seller; identification of the goods to be purchased; the buyer's credit card information and any other miscellaneous information needed to complete the financial transaction between the buyer and seller (step 208). Alternatively, some, or all the later information may be automatically transmitted from the site from which the buyer accessed the money order system 100, if so programmed. For example, when the buyer receives the web page of the auction site 10 confirming the bid award, the buyer may click a hyper-link provided on this page which not only accesses the money order system site 100, but also automatically transmits all the information necessary to purchase a money order with perhaps the exception of the buyer's credit card information.

In yet another alternative embodiment of the invention, a user may establish an account with the money order system 100. In this embodiment, the user either credits or deposits a fund amount with the money order system 100, which is preferably stored in the database 110 of the money order system. Thus, when the user 14 desires to purchase a money order, the user need not to transmit any credit card information, but rather the funds needed for the user's desired money order is subtracted from the user's account preferably stored in database 100. This arrangement is particularly advantageous for user's who have no credit cards or desires to avoid their use.

Returning to the preferred embodiment, after the user 14 transmits the aforesaid necessary information to the money order system 100 (step 208), this information is received by the money order system server 102 (210) which then sends the information to a computer processor 106. The processor 106 extrapolates the credit card information from the buyer's information and preferably transmits it to the billing server 16. The billing server 16 processes this credit card information (step 212) so as to authorize the money order for the requested funds. The billing server 16 then communicates with the money order system 100 to provide authorization for the requested money order (step 214). Once the money order system 100 receives the aforesaid authorization from the billing server 102, processor 106 preferably instructs money order dispensing apparatus 108 to generate the requested money order (step 216). It is to be understood that the money order dispensing apparatus may be either automatic or manual. The money order, and any other pertinent information needed to ship the goods is sent to the buyer, preferably via the mail system (step 218).

The money order system 100 is also preferably configured to sent an e-mail message to both the buyer and seller notifying them that the money order has been ordered, authorized and sent to the seller (step 220). Thus, since this message is being sent by the secure third party of the money order system 100, the buyer can trust this information and go ahead and ship the goods to the buyer without yet receiving the money order. Thus, one advantage of the system of the present invention is clearly evident in that as soon as a buyer desires to purchase goods from a seller with a money order, the seller may immediately ship the goods to the buyer (upon the aforesaid notification from the money order system 100) without having to wait for the money order, which may typically take up to five (5) days if transmitted by regular mail.

The billing server 16 then transmits the funds to the money order system 100 that were debited from the buyer's credit card which were needed to generate the purchased money orders preferably through an Automated Clearing House (ACH) 20 (step 222). Of course the billing server may retain a portion of these funds for their credit card services.

In summary, a money order system providing the purchase of money orders via the internet has been described. Although the present invention has been described with emphasis on a particular embodiment, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method of purchasing a money order from a money order system via the Internet for the purchase of goods purchased from an Internet-based auction transaction, wherein the money order is guaranteed by a third party other than a seller or a buyer in the auction transaction, the method including the steps of:
    awarding a bid to a buyer for goods to be purchased from a seller from an auction process conducted between said buyer and seller via the Internet on an Internet auction site;
    contacting an Internet site for said money order system via the Internet by said buyer with a computing device after said bid is awarded to said buyer by the Internet auction site;
    providing a hyper-link in the auction site to the money order system site;
    transmitting information to said money order system via the Internet to purchase said money order for said sale of said goods won during the auction process with the Internet auction site, said information including at least said buyer's identification, an identification of said seller and a financial amount for the money order, wherein:
        said financial amount is related to the bid, and
        at least some of said information is processed in a billing server associated with the money order system;
    transmitting credit card information associated with said buyer to said money order system Internet site;
    electronically processing said credit card information to make available funds needed for said purchase of said money order by said buyer in said money order system site;
    printing a money order from said money order system with a money order dispensing apparatus upon receipt of said transmitted information from said buyer;
    initiating physical delivery of said generated money order from the money order system to said seller, whereby the money order can be used to pay the seller for the purchase of the goods;
    initiating physical delivery of said goods from said seller to buyer after said money order is printed; and
    generating a message from the money order system to at least one of said buyer or seller stating that said money order has been sent to said seller.

2. The method of purchasing a money order from a money order system via the Internet for the purchase of goods purchased from an Internet-based auction transaction according to claim 1, further comprising a step of transmission of funds associated with the credit card information to benefit the money order system.

3. The method of purchasing a money order from a money order system via the Internet for the purchase of goods purchased from an Internet-based auction transaction according to claim 1, further comprising a step of transmitting funds to a bank associated with the money order system to fund the money order.

4. The method of purchasing a money order from a money order system via the Internet for the purchase of goods purchased from an Internet-based auction transaction according to claim 1, further comprising a step of transmitting funds to a bank associated with the money order system to fund the money order using an automated clearing house (ACH).

5. The method of purchasing a money order from a money order system via the Internet for the purchase of goods purchased from an Internet-based auction transaction according to claim 1, wherein the money order system comprises at least two of:
    a server;
    a firewall;
    a processor;
    the money order dispensing apparatus; and
    a database.

6. The method of purchasing a money order from a money order system via the Internet for the purchase of goods purchased from an Internet-based auction transaction according to claim 1, further comprising steps of:
    establishing a funds account on said buyer's behalf with said money order system, said funds account having a predetermined amount of monetary funds; and
    electronically deducting a predetermined amount of funds from said funds account in accordance with the amount of funds required to generate said money order.

7. The method of purchasing a money order from a money order system via the Internet for the purchase of goods purchased from an Internet-based auction transaction according to claim 1, further comprising a step of communicating with the seller to confirm that the money order has been authorized.

8. The method of purchasing a money order from a money order system via the Internet for the purchase of goods purchased from an Internet-based auction transaction according to claim 1, wherein the money order system comprises a database comprising data for submitting an electronic funds transfer request and data for money order authorizations.

* * * * *